United States Patent
Charle et al.

(10) Patent No.: US 9,784,970 B2
(45) Date of Patent: Oct. 10, 2017

(54) DISPLAY DEVICE FOR A MOTOR VEHICLE

(71) Applicant: GM GLOBAL TECHNOLOGY OPERATIONS LLC, Detroit, MI (US)

(72) Inventors: Heiko Charle, Rüsselsheim (DE); Peter Brandt, Aschaffenburg (DE); Georg Bauer, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/042,494

(22) Filed: Feb. 12, 2016

(65) Prior Publication Data

US 2016/0238840 A1 Aug. 18, 2016

(30) Foreign Application Priority Data

Feb. 13, 2015 (DE) .................. 10 2015 001 930

(51) Int. Cl.
| | |
|---|---|
| G02B 27/14 | (2006.01) |
| G02F 1/03 | (2006.01) |
| G02F 1/07 | (2006.01) |
| G02B 27/01 | (2006.01) |
| F21V 8/00 | (2006.01) |
| G02B 5/18 | (2006.01) |

(52) U.S. Cl.
CPC .......... *G02B 27/0101* (2013.01); *G02B 5/18* (2013.01); *G02B 6/0035* (2013.01); *G02B 6/0068* (2013.01); *G02B 2027/0112* (2013.01); *G02B 2027/0118* (2013.01)

(58) Field of Classification Search
USPC ........ 359/242, 290–292, 298, 630, 631, 634
See application file for complete search history.

(56) References Cited

U.S. PATENT DOCUMENTS

| | | | |
|---|---|---|---|
| 4,711,512 A | 12/1987 | Upatnieks | |
| 4,737,001 A | 4/1988 | Moss | |
| 4,892,369 A * | 1/1990 | Moss | B60Q 1/302 116/202 |
| 5,668,907 A * | 9/1997 | Veligdan | G02B 6/02 385/115 |
| 6,137,630 A * | 10/2000 | Tsou | G02B 1/10 359/485.03 |
| 2007/0201234 A1 | 8/2007 | Ottermann | |
| 2007/0210906 A1 | 9/2007 | Knoll et al. | |
| 2011/0267833 A1 | 11/2011 | Verrat-Debailleul et al. | |

FOREIGN PATENT DOCUMENTS

| | | |
|---|---|---|
| DE | 4211728 A1 | 10/1993 |
| DE | 102007012571 A1 | 1/2008 |
| DE | 102009010623 A1 | 9/2010 |
| WO | 9924958 A1 | 5/1999 |

OTHER PUBLICATIONS

German Patent Office, German Search Report for German Application No. 102015001930.9, dated Oct. 12, 2015.

* cited by examiner

*Primary Examiner* — Brandi Thomas
(74) *Attorney, Agent, or Firm* — Lorenz & Kopf LLP

(57) ABSTRACT

A display device includes a translucent windscreen, particularly the windscreen of a motor vehicle, a narrow-band light source that emits light into the windscreen via an edge thereof, and a periodic structure formed in the windscreen that bends the light from the light source toward the eye of a driver.

10 Claims, 2 Drawing Sheets

DISPLAY DEVICE FOR A MOTOR VEHICLE

CROSS-REFERENCE TO RELATED APPLICATION

This application claims priority to German Patent Application No. 102015001930.9, filed Feb. 13, 2015, which is incorporated herein by reference in its entirety.

TECHNICAL FIELD

The present disclosure pertains to a display device that is usable particularly in a motor vehicle for displaying information to the driver of the motor vehicle.

BACKGROUND

A display device is described in DE 10 2004 016 808 A1, in which the windscreen of a motor vehicle serves as the display screen. In this conventional display device, display elements are distributed over a significant fraction of the vehicle windscreen, to each of which light is directed via a waveguide associated with a light source arranged at the edge of the windscreen. To ensure that the light from such a light source actually reaches the eyes of the driver of the motor vehicle, it must be diffused in the display elements. The display elements should not obstruct the driver's vision when they are not lit. Therefore, they should include structures that are small enough to be invisible to the human eye when they are not lit.

However, such structures affect ambient light in the same way as they do to the light from the light source, that is to say they scatter it. Accordingly, the windscreen inevitably appears cloudy to the operator at the sites where display elements are located. The more brightly the display element is intended to appear for a given illumination strength from the light source, in other words, the more densely the light-scattering structures are positioned, the more pronounced the cloudiness appears. In order to ensure that the display element is clearly visible while minimizing the clouding of the windscreen, the density with which the light-scattering structures are positioned must be low, and the light source that illuminates the display element must emit correspondingly more light. This leads to increased energy consumption and distracting light reflections can also occur at the edges of the windscreen if a large proportion of the light is propagated through the windscreen without being diffused to the outside by a display element.

SUMMARY

The present disclosure provides a display device with a translucent windscreen that offers a high degree of visibility even with a light source having low light intensity. According to one variant of the present disclosure, a display device includes a translucent windscreen with which a light source emitting light into the windscreen via an edge thereof is designed with narrow bandwidth and a periodic structure the diffracts the light from the light source is constructed in the windscreen. With such a structure, the light from the light source can be deflected selectively and very efficiently in a direction from which it should be visible, whereas most of the broadband ambient light that passes through the windscreen is not diffused, so that the visibility of the periodic structure is in fact effectively minimized when it is not illuminated by the light source.

A line grid is particularly suitable for use as the periodic structure. If the periodic structure includes alternating zones with different refractive indices, light may be diffracted while minimizing the amount of light absorbed, and such a structure also favors the propagation of the light from the light source in the windscreen such that the light passes through a plurality of zones with different refractive indices.

In order to guide the light from the light source to the periodic structure, the windscreen may include at least one planar waveguide, which is embedded between two covering layers. The waveguide is planar not only to keep the light bundled perpendicularly to the plane of the windscreen, but at the same time to allow it to spread over the entire width of the windscreen, so that a single light source is able to illuminate a periodic structure in the windscreen extending perpendicularly to its primary radiation direction. The covering layers generally have a higher refractive index than the planar waveguide, so that the light can be guided inside the planar waveguide by total internal reflection. The periodic structure may be constructed on a surface of a covering layer adjacent to the planar waveguide, or inside the planar waveguide itself, the latter alternative being preferred in this case. Multiple periodic structures with different periods may overlap on the windscreen.

Each of these multiple periodic structures may be assigned to a light source. The wave-like light source is adapted to the period of the assigned periodic structure in such manner that the periodic structures bend light from the respectively assigned light sources in the same direction. In this way, it is possible for a user looking at the display device from this direction to see different colored light signals at the same location on the windscreen.

In addition, at least two periodic structures arranged at a distance from each other may be formed on the windscreen, so that information can also be communicated to the user based on the location where periodic structure lights up on the windscreen from the viewpoint of the user. In this case too, the at least two periodic structures should be assigned to one light source, wherein the wavelength of each light source is adapted to the period of the assigned period structure such that beams bent at the periodic structures intersect each other. When the user directs his gaze at this intersection point, the multiple periodic structures can be perceived simultaneously.

According to a preferred application, the windscreen is designed as a windscreen for a motor vehicle. The at least one periodic structure should then bend light in the direction of the driver's head.

If the at least one periodic structure is constructed symmetrically relative to a mirror image on the plane of the windscreen, light will then also be deflected to the outside with the same intensity as it is deflected in the direction of the driver's head, and will thus be wasted. With a suitable asymmetry of the periodic structure relative to a mirror image on the plane of the windscreen, the portion that is deflected to the outside can be minimized, to the benefit of the portion that is deflected toward the driver's head.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
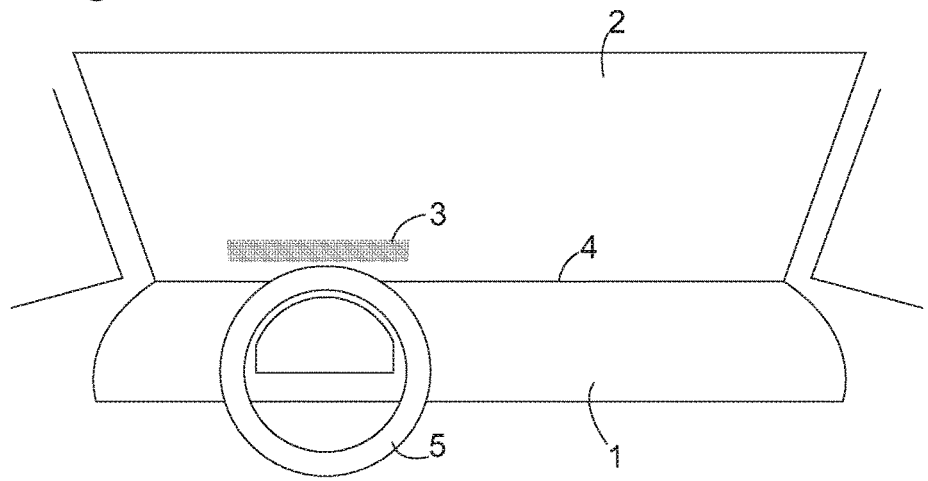
FIG. 1 is a schematic view of a front windscreen and dashboard of a motor vehicle equipped with a display device according to the present disclosure.

FIG. 1 shows a schematic view of a motor vehicle dashboard 1 and windscreen 2 from the perspective of a driver. A periodic structure in the form of a line grid 3 is arranged in windscreen 2, next to the bottom edge 4 thereof, in the driver's direct forward line of vision, on the other side of steering wheel 5. Narrow-band monochromatic LEDs, which radiate light into windscreen 2 via bottom edge 4 are hidden in dashboard 1 below the bottom edge 4 of windscreen 2.

Figure 2:
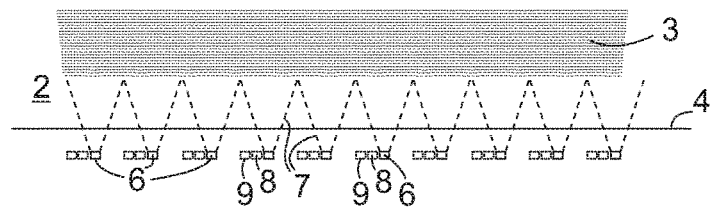
FIG. 2 is an enlarged schematic representation of a bottom edge of the windscreen.

FIG. 2 is an enlarged schematic representation of the bottom edge area of windscreen 2 with line grid 3 and a plurality of LEDs 6 arranged at intervals along edge 4 in order to emit monochromatic light into windscreen 2 via edge 4. The distance between the lines in line grid 3 is selected such that mainly deflected light from LEDs 6 is propagated from line grid 3 toward the driver's eyes, that is to say in an X-Z plane of the motor vehicle, rising slightly toward the rear.

Whereas the of LEDs 6 remains bundled closely together on the way from bottom edge 4 to line grid 3 in a direction perpendicular to the windscreen surface due to reflection on boundary layers of windscreen 2, such bundling is not provided in the plane of windscreen 2; as is indicated by light cone 7 represented by the dashed lines in FIG. 2, the light is able to propagate freely laterally in the plane of windscreen 2, so that a limited number of LEDs 6, arranged at a distance from each other is sufficient to illuminate the line grid 3 evenly along the entire extension thereof, and there is still room for additional LEDs 8, 9 between LEDs 6, which additional LEDs emit the monochromatic light at different wavelengths from LEDs 6.

Figure 3:
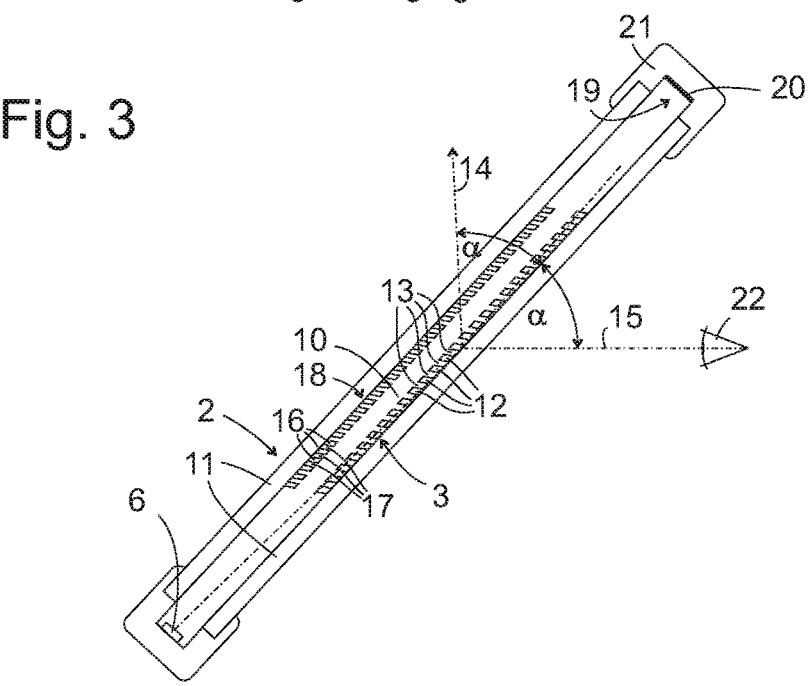
FIG. 3 is a schematic section through the windscreen according to a first variant of the present disclosure.

FIG. 3 shows a schematic longitudinal section through windscreen 2. The section plane extends perpendicularly to the lines of line grid 3 through one of the LEDs 6. Line grid 3 is constructed from plastic in a planar waveguide layer 10, which is embedded between two covering layers 11 made from mineral glass. In order to keep the light from the LEDs trapped inside waveguide layer 10, the refractive index thereof is lower than that of the cover layers 11. Windscreens with a sandwich structure, in which a tough plastic layer is embedded between two layers of mineral glass, are known as safety glass and are already used widely in motor vehicle construction. The plastic layer of such safety glass may be used according to the present disclosure to form line grid 3 in the interior thereof.

Light from LEDs 6 that is not bent at line grid 3 propagates further in waveguide layer 10 until it reaches an absorber 20 located on a top edge 19 of windscreen 2. Absorber 20 may be formed by a black colored layer on top edge 19, preferably arranged at the bottom of a groove, for example of a gasket 21 that surrounds the periphery of windscreen 2 to block any possible reflection from absorber 20 from dazzling the driver and other road users.

The lines of line grid 3 are formed by zones 12, 13 extending perpendicularly to the section plane, wherein the refractive index of zones 12 is different from the refractive index of the surrounding plastic material of waveguide layer 10. Such zones 12 may be obtained for example if during curing waveguide layer 10 is exposed to two intersecting laser beams which thus create an interference pattern corresponding to the arrangement of zones 12 in the waveguide layer 10.

In FIG. 3, each of zones 12 is created with a cross section that is asymmetrical relative to a mirror image in a plane that is parallel to the surface of windscreen 2, and in this case is diamond-shaped. If zones 12 were symmetrical relative to the plane of propagation of the light in windscreen 2, a deflected beam 14 that escapes from windscreen 2 would be just as intense as the beam 15 reaching the driver's eye 22 that is deflected at an angle equal to that of beam 14 opposite to the original direction of propagation of the light in waveguide layer 10. The asymmetry makes it possible to make beam 15 more intense than beam 14 and thus make efficient use of the light from LEDs 6.

Zones 12 might extend across the entire thickness of waveguide layer 10, from one covering layer 11 to the other, to obtain an intense, deflected beam 15. In the variant of FIG. 3, however, zones 12 are only limited to one surface of waveguide layer 10, whereas zone 16, 17 of a line grid 18 having a shorter period than that of line grid 3, are located on the opposite surface. The period of line grid 18 is tuned to the wavelength of LEDs 8 (see FIG. 2), so that the light therefrom is bent in the same direction as beam 15, toward the eye 22 of the driver. In this way, two signals can be displayed in different colors in the same area of windscreen 2 from the viewpoint of the driver.

The light does not propagate exactly parallel to the surface in waveguide layer 10, but rather various propagation modes exist in which the light travels at individually different, small angles to the surface of waveguide layer 10, which means that the deflected light is also not bundled exactly in the direction of beam 15, but at all events beam 15 determines the direction of maximum intensity of the bent light; it is also visible from an eye position that is higher or lower than the position shown, though with less intensity.

Figure 4:
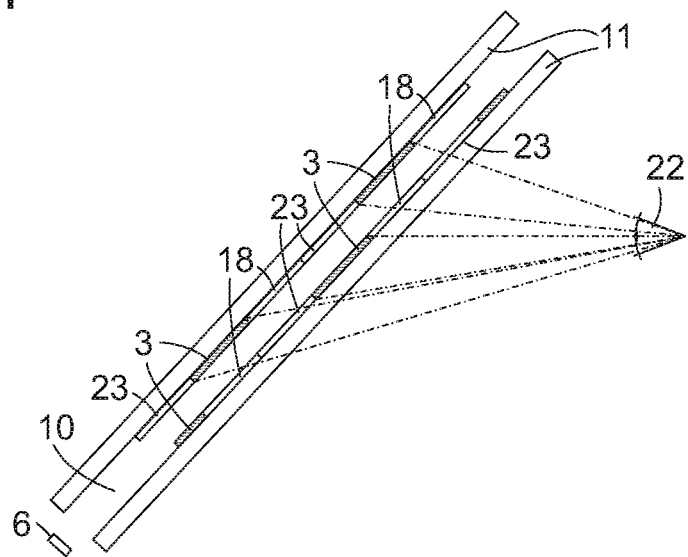
FIG. 4 is a schematic section similar that of FIG. 3 according to a second variant of the present disclosure.

FIG. 4 shows a development of the variant of FIG. 3, in which line grids with different periods are arranged in alternating manner on both surface of waveguide layer 10. In the case under consideration here, line grids 3, 18, 23 have three different periods, which are tuned respectively to the wavelengths of LEDs 6, 8, 9 on bottom edge 4 of windscreen 2, to bend the therefrom to the highest possible degree toward the driver's eye 22. The line grids 3 indicated by hatching in the figure are located in alternating manner on the inside and outside of waveguide layer 10, and they each partially overlap one line grid 18 and one line grid 23 on the opposite side of waveguide layer 10 in each case. If the various line grids 3, 18, 23 are arranged sufficiently close together, each appears to form an evenly illuminated area when seen from a distance with the eyes 22 of the driver.

The wavelengths of LEDs 6, 8, 9 may each be selected from the red, yellow and green spectral range to communicate a warning signal to the driver with various levels of urgency. It is also conceivable to use red, green and blue LEDs so that when all LEDs are activated together an area of white light it presented to the driver's eye 22, or to generate light signals in various shades of color, optionally with incrementally variable intensities, by actuating different LEDs 6, 8, 9 selectively.

Figure 5:
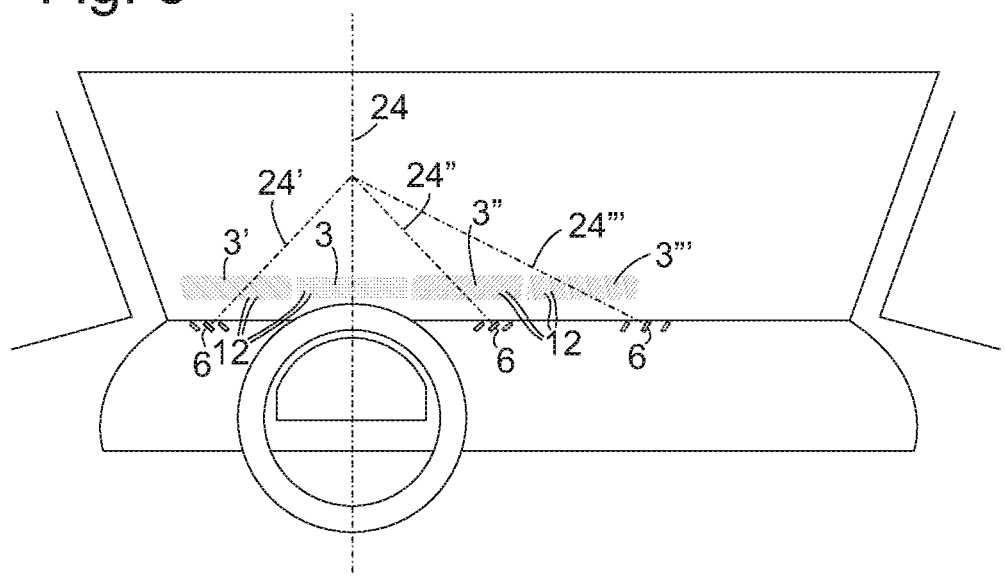
FIG. 5 is a view similar to that of FIG. 1 of a third variant of the present disclosure.

FIG. 5 shows a view similar to the FIG. 1 according to a refinement of the present disclosure, in which a plurality of line grids 3—optionally overlapping with line grids 18, 23 having different line separations as described above—are distributed across the entire width of windscreen 2. A dash-dotted line indicates a vertical plane 24, which passes through an LED that is concealed behind steering wheel 5 and in which the light from this LED propagates, at first inside windscreen 2 through the central line grid 3, and after deflection at line grid 3 toward the eye 22 of the driver. The linear zones 12, 13 of central line grid 3 are aligned vertically on plane 24.

In the same way, a plane 24', 24" may also be assigned to each of the non-central line grids 3', 3" in which plane the light from the LEDs 6 assigned to the line grids 3', 3" must propagate in order to reach the eye of the driver. In order to achieve efficient deflection between the eyes of the driver, all of these line grids 3', 3" have lines 12 that are aligned vertically on the corresponding planes 24', 24".

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A display device comprising:
a translucent windscreen having an edge and a plurality of periodic structures adjacent the edge, the periodic structures having different periods overlapping on the windscreen;
a narrow-band light source emitting light into the edge of the windscreen; and
wherein the periodic structures are configured to bend light from the light source in a direction away from a surface of the windscreen and wherein a light source is assigned to each of the periodic structures and the wave-length of each light source is adapted to the period of the period structure to which it is assigned in such manner that the periodic structures bend the light from the assigned light sources in a common direction.

2. The display device according to claim 1, wherein the periodic structures comprise a line grid.

3. The display device according to claim 1 wherein the periodic structures comprise a plurality of alternately arranged zones including a first zone have a first refractive index and a second zone having a second refractive index which is different from the first refractive index.

4. The display device according to claim 1, wherein the windscreen comprises at least one planar waveguide embedded between two covering layers.

5. The display device according to claim 4, wherein the periodic structures are constructed inside the planar waveguide.

6. The display device according to claim 1 further comprising a windshield for a motor vehicle defining the windscreen.

7. The display device according to claim 6, wherein the periodic structures are configured to bend light in a direction towards an eye of a driver of the motor vehicle.

8. The display device according to claim 6, wherein the periodic structures are asymmetrical relative to a mirror image on the plane of the windscreen.

9. A display device comprising:
a translucent windscreen having an edge and at least two periodic structures adjacent the edge;
a narrow-band light source emitting light into the edge of the windscreen; and
wherein the periodic structures are configured to bend light from the light source in a direction away from a surface of the windscreen and the at least two periodic structures are formed on the windscreen at a distance from each other and a light source assigned to each of the at least two periodic structures, wherein the wavelength of each light source is tuned to the period of the periodic structure to which it is assigned and is configured to bend the beams where the at least two periodic structures intersect with each other.

10. A display device comprising:
a translucent windscreen having an edge and a periodic structure adjacent the edge;
a narrow-band light source emitting light into the edge of the windscreen; and
wherein the periodic structure is configured to bend light from the light source in a direction away from a surface of the windscreen, the periodic structure comprises a line grid having lines formed by zones extending perpendicularly to a section plane, and the periodic structure comprises a plurality of alternately arranged zones including a first zone have a first refractive index and a second zone having a second refractive index which is different from the first refractive index.

* * * * *